Dec. 22, 1959 A. H. W. BECK ET AL 2,918,599
ELECTRON VELOCITY MODULATION TUBES
Filed June 20, 1955 4 Sheets-Sheet 1

Inventors
A. H. W. BECK
G. P. DE MENGEL
By [signature]
Attorney

Dec. 22, 1959 A. H. W. BECK ET AL 2,918,599

ELECTRON VELOCITY MODULATION TUBES

Filed June 20, 1955 4 Sheets-Sheet 2

Inventors
A. H. W. BECK
G. P. DE MENGEL
By R. P. Morris
Attorney

Inventors
A. H. W. BECK-
G. P. DE MENGEL
By [signature]
Attorney

ELECTRON VELOCITY MODULATION TUBES

Filed June 20, 1955

4 Sheets-Sheet 4

Inventors
A. H. W. BECK-
G. P. DE MENGEL
By [signature]
Attorney

United States Patent Office 2,918,599

Patented Dec. 22, 1959

2,918,599

ELECTRON VELOCITY MODULATION TUBES

Arnold Hugh William Beck and Gaston Pakenham de Mengel, London, England, assignors to International Standard Electric Corporation, New York, N.Y.

Application June 20, 1955, Serial No. 516,584

Claims priority, application Great Britain July 14, 1954

5 Claims. (Cl. 315—5.41)

The present invention relates to low noise klystron amplifiers and to the construction of klystron tubes for use in such amplifiers.

In the field of centimetric wave communication there has long been a need for a low noise input amplifier. In the absence of a suitable amplifier recourse has had to be made to frequency conversion. Thus in a repeater for a radio link, the signal is taken direct to a crystal frequency-changer stage, amplification is effected at a relatively low intermediate frequency and an output oscillator is modulated with the amplified intermediate frequency signal. It is true that usually, for reasons which need not be considered here, the input and output frequencies at a repeater station are different; nevertheless, even if a frequency change is desired, a pre-amplifier would be very valuable. To be of use, the noise introduced by the input amplifier must not be worse than that due to the crystal mixer stage and must give a gain such that noise contributions of succeeding circuits such as a second amplifier stage or frequency changing stage can be neglected.

Recently, following numerous investigations into the nature of noise arising in velocity modulation amplifiers, low noise travelling wave tubes have been produced, but the critical adjustments necessary to obtain low noise have so far prevented their commercial use, while other inherent characteristics of low noise travelling wave tubes render them objectionable in certain fields such as frequency modulated radio links. An amplifier of the klystron type, utilising what is known as "velocity jump" amplification, has many inherent advantages over the travelling wave tube if a low noise klystron could be produced. It is known that a klystron tube has a minimum noise figure of about 6 db, which would be very acceptable for an input tube: as previously proposed, the tube would, however, be of the high current, low voltage class which would render it quite unsuitable as an input amplifier. In a low noise klystron a pre-buncher drift tube separates the electron gun anode and the klystron buncher gap; it has, until now, been held that this pre-buncher drift tube must be of such length that the noise current in the beam is a minimum at the buncher gap. The figure of 6 db moreover, is derived by assuming the presence of noise currents in addition to the noise contributions normally considered in noise analysis of thermionic devices. Whether these additional noise contributions do in fact occur is not yet proven, but our analysis of the noise in an electron beam given hereafter leads to the conclusion that the position of the klystron buncher gap has been wrongly chosen: with the buncher gap correctly positioned use may be made of the principles of velocity jump amplification to produce a comparatively low power amplifier, the design problems being considerably eased by the use of a velocity jump in the pre-buncher drift tube even though this may not result in a further reduction of the noise figure.

In accordance with the present invention there is provided an electron velocity modulation amplifier comprising an electron gun having at least a thermionic cathode and an apertured anode, a plurality of resonators each separated from the next by a drift space, a buncher gap in the first of the said resonators, a catcher gap in a second of the said resonators, at least one section of a drift tube situated between the said anode and the said buncher gap, means for projecting a beam of electrons from the said electron gun through said section of drift tube, said buncher gap, said drift tube space and said catcher gap, the length of the said section of drift tube in terms of the electron plasma wavelength of the said beam therein at the mid-band frequency of the amplifier being so proportioned that the mean square noise velocity of the beam electrons at said frequency attains a maximum value between the said anode and the said buncher gap and attains a minimum value at the said buncher gap.

According to another aspect the invention provides a low noise electron velocity modulation inut amplifier comprising an electron gun and buncher and catcher resonators as in a klystron amplifier, the said resonators being separated by lengths of drift tube arranged to provide velocity jump amplification, characterised in this that in the absence of velocity jump amplification the amplifier would give a power loss instead of a gain, while noise reduction is achieved by the provision of one or more lengths of pre-buncher drift tube arranged so that the mean square noise velocity in the beam at the buncher gap is a minimum.

The invention will be better understood by first considering an analysis of the noise produced in a klystron amplifier tube under various conditions.

In what follows the following system of units will be used:

$V$ voltage, usually with an appropriate suffix for identification.

$V_0$ steady—i.e. D.C.—voltage.

$u$ steady or "D.C." electron velocity.

$v$ electron velocity modulation, considered as superimposed on the steady velocity $u$ analogously to A.C. and D.C. voltages—hence may be referred to as A.C. velocity.

$v_m$ peak electron velocity modulation.

$I_0$ electron beam current (D.C.).

$J_0$ electron beam current density.

$b$ electron beam radius.

$\omega$ angular frequency of electromagnetic waves.

$\omega_1, \omega_2 \ldots \omega_q$ electron plasma frequency in region 1, 2 . . . q.

$\omega_p$ electron plasma frequency for plane space charge waves.

$\beta$ gap modulation coefficient.

$\eta$ numerical ratio of charge to mass of an electron $=1.76\times10^{11}$ coulombs per kilogramme.

$\epsilon_0$ dielectric constant of free space $$=\frac{1}{36\pi}\times10^{-9}$$

farads per metre, (The rationalized M.K.S. systems of units will be used throughout)

To avoid the use of the bar or rule, quantities to be averaged will be put in diamond-shaped brackets; thus $$\langle v_{mq}^2 \rangle$$

denotes the mean square of the peak velocity modulation in region $q$.

Other symbols will be defined as they are introduced into the work.

Different regions of an electron beam to which correspondingly different constants apply require to be distinguished. To identify the region a suffix or additional suffix will be added to the symbol concerned and, in some cases, a further suffix to indicate that the quantity concerned is evaluated at the input or the output of the region. Thus $V_{02}$ denotes the D.C. beam voltage at the input of region 2, and $v_{21}$ the A.C. velocity at the input of region 2, the A.C. velocity at the output being denoted by $v_{22}$.

In order to discuss the noise in an electron beam, some of the known results of the theory of electron velocity modulation are first given.

This discussion and the subsequent description of the invention are illustrated by the accompanying drawings in which.

Figure 1:
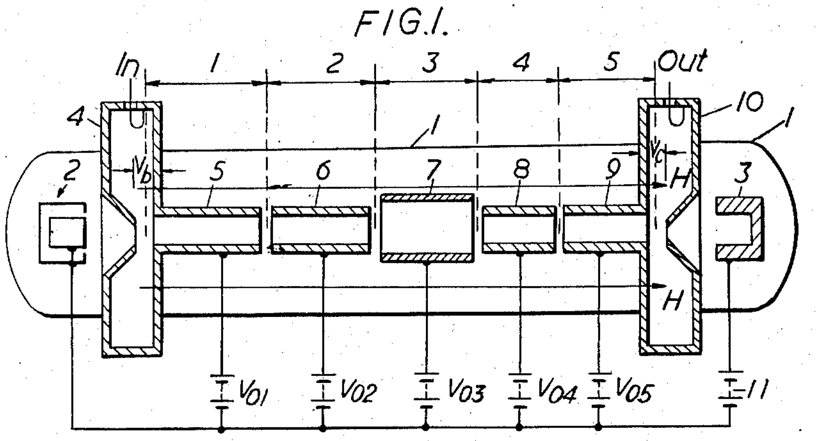
Fig. 1 shows diagrammatically a known form of velocity jump amplifier.

Referring to the drawings and first to Fig. 1, the theory of electron velocity modulation is first given. Fig. 1 shows diagrammatically a klystron amplifier with "velocity jump." The electron discharge tube is contained within an envelope 1 and comprises an electron gun 2, electron collector electrode 3 and, disposed in order between them, a buncher resonator 4 having a signal input coupling labelled In, five sections of drift tube 5, 6, 7, 8, 9 and an output resonator 10 from which the output signal is extracted by way of the coupling loop labelled Out. The drift tube sections are not necessarily of the same diameter and, in general, will be of different lengths. The electron collector electrode 3 is connected to a source of potential 11 to fix its potential with respect to the cathode of gun 2, while to the other members are applied potentials $V_{01}$, $V_{02}$ etc. as indicated. The electron beam is magnetically focussed by an axial magnetic field indicated by the lines of force H. The electron beam path is axially divided into regions labelled 1 to 5 whose lengths are measured from the centre of one gap to the centre of the next. The lengths of the gaps between the drift tube sections, as also the lengths of the buncher and catcher gaps, are assumed negligible.

A signal applied to the coupling In sets up a sinusoidal voltage of peak amplitude $V_b$ across the gap in the resonator 4. This gives rise to a sinusoidal electron velocity modulation of amplitude $v_m$ given by $$v_m=\beta V_b/u \qquad (1)$$

where $u^2=2\eta V_0$

In traversing the drift space between buncher and catcher gaps, the velocity modulation impressed on the beam gives rise to a series of standing waves of space charge, so that at the catcher gap the electron beam current has an A.C. component $i$ which generates a voltage $V_c$ across the catcher gap given by $$V_c=i\beta R \qquad (2)$$

where R is the shunt resistance of the parallel tuned circuit equivalent of the catcher resonator 10 loaded by an output load connected to Out. The gap modulation factors $\beta$ in Equations 1 and 2 are not necessarily equal, but it is assumed in the following that both input and output resonators are identical and at the same potential, the $\beta$ factors thus being the same.

*Space charge waves in drift tube*

The standing waves of space charge set up in any region $q$ may be characterized by waves of velocity modulation of amplitude $v_q$ and current waves of amplitude $i_q$ such that $$v_q=v_m\cos\left(\frac{\omega_q}{u_q}z-\psi\right) \qquad (3)$$

$$i_q=jv_m\frac{\omega}{\omega_q}\frac{I_0}{u_q}\sin\left(\frac{\omega_q}{u_q}z-\psi\right) \qquad (4)$$

where $z$ is the coordinate of axial position measured from the commencement of the region $q$, $\psi$ is a spatial phase constant and $j^2=-1$. $\omega_q$ is the electron plasma frequency for the region $q$ given by $$\omega_q=M\omega_p \qquad (5)$$

where M is a numerical factor depending, inter alia, upon the geometry of the drift tube and beam and $\omega_p$ is the plasma frequency for plane space charge waves under the same conditions of voltage and current density, $\omega_p$ being given by $$\omega_p^2=\frac{\eta J_0}{\epsilon_0 u} \qquad (6)$$

$$=3.35\times10^{10}\frac{J_0}{V_0^{1/2}} \qquad (6a)$$

Where confusion might arise as to the region in which $\omega_p$ is to be evaluated, $\omega_{p1}$, $\omega_{p2}$ etc. will be referred to.

Figure 2:
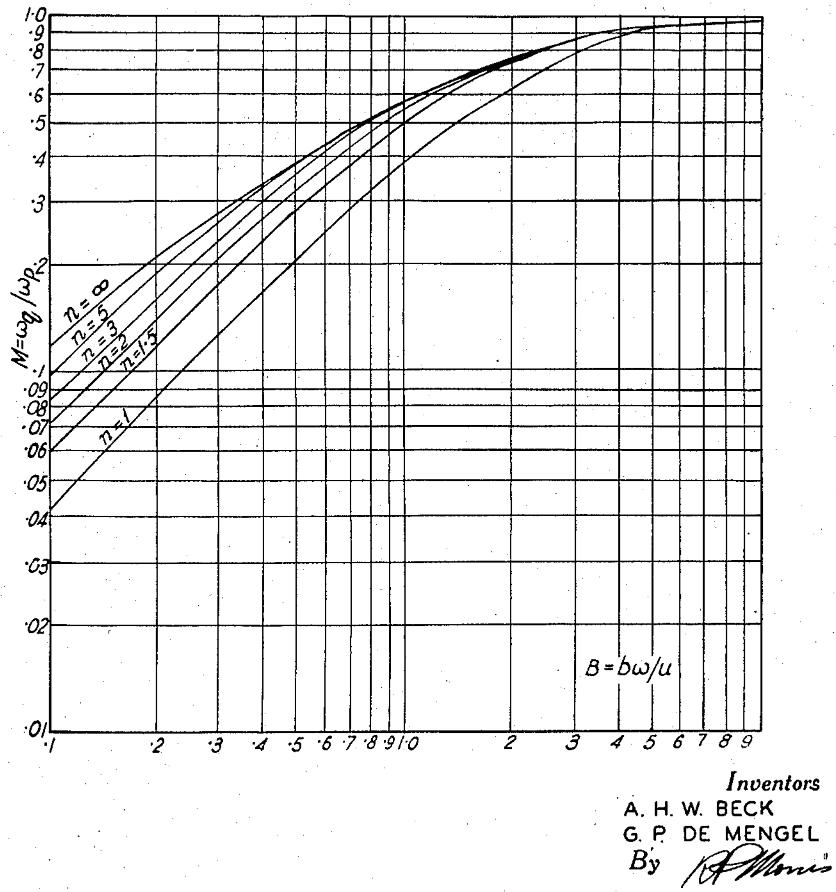
Figs. 2 and 3 show curves relating to the properties of electron space charge waves.
Figure 3:
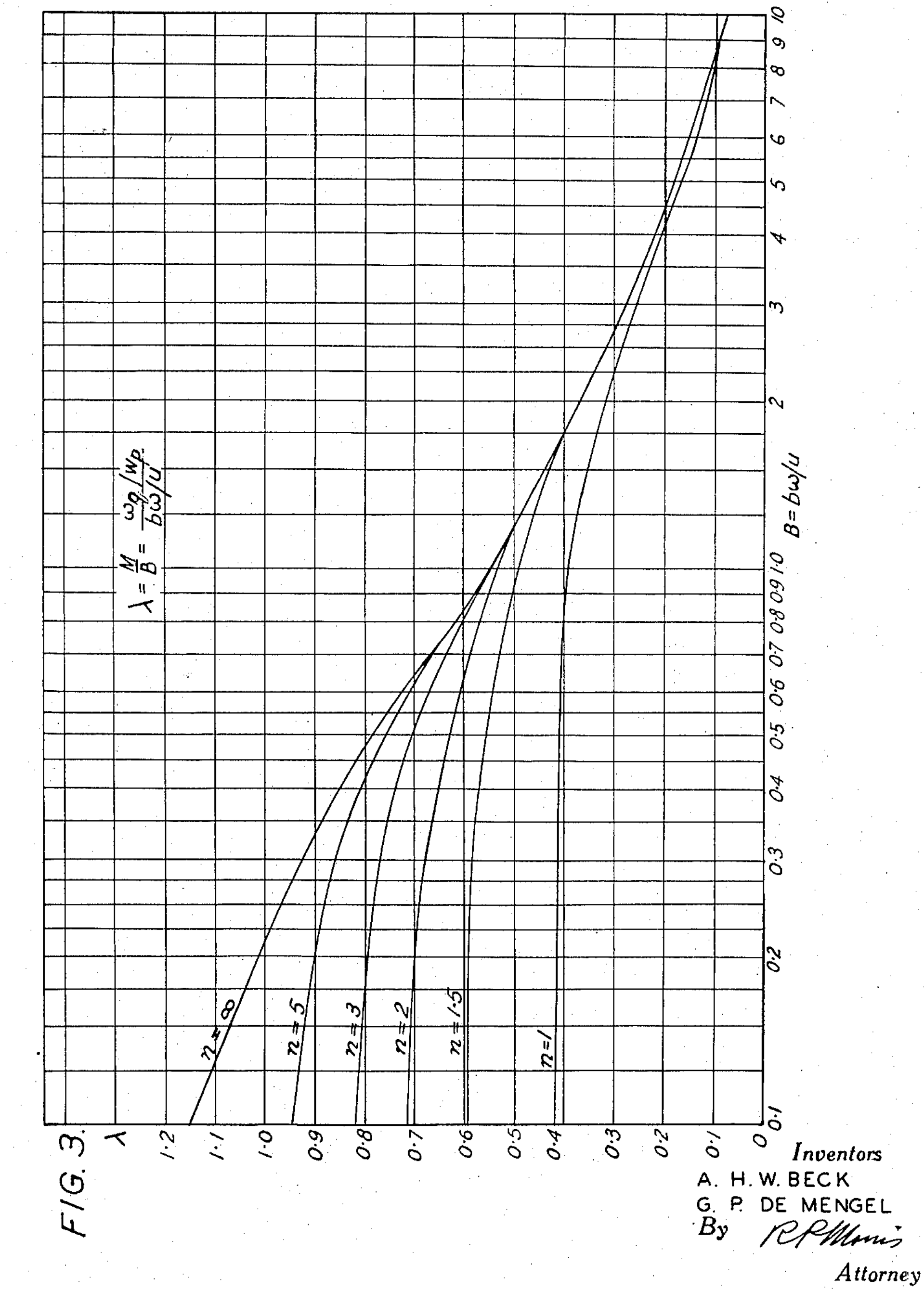

For cylindrical beams of radius $b$ and drift tube radius $nb$ ($n=1, 2, 2 \ldots$) the factor M is given by the family of curves shown in Fig. 2. The abscissae are in terms of $$B=b\omega/u \qquad (7)$$

and $n=1$ refers to a beam grazing its surrounding drift tube, while $n=\infty$ relates to a drift tube of infinite radius surrounding a beam of finite radius. For some purposes it is convenient to evaluate M in terms of B, and a derived family of curves of the quantity $$\lambda=M/B \qquad (8)$$

plotted against B as shown in Fig. 3. It will be seen that for low values of $n$, $\lambda$ tends to be constant over much of the range of B.

*Basic klystron gain*

In the circuit of Fig. 1 assume that all the drift tube sections are of the same diameter and at the same potential, i.e. they could be replaced by a single drift tube at the same potential as each of the resonators.

At the drift tube entry $v=v_m$ so that $\psi$ of Equations 3 and 4 is zero, while, if the drift tube length be such that $\sin \omega_q z/u=1$, at the catcher gap we have, from (4)

$$i_q=v_m\frac{\omega}{\omega_q}\frac{I_0}{u}$$

For identical resonators it follows from Equations 1 and 2

$$\left|\frac{V_c}{V_b}\right|=\frac{\beta^2 I_0 R}{2V_0}\frac{\omega}{\omega_q} \qquad (9)$$

Putting $$P=\frac{2V_0}{I_0\beta^2 R} \qquad (10)$$

the basic klystron loss L becomes $$L=|V_b/V_c|=MP\omega_p/\omega \qquad (11)$$

or, in decibels, the basic klystron power gain $=-20\log_{10}L$.

*Velocity jump gain*

Reverting to the sectionalized drift tube of Fig. 1, at the entry and exit of region 1, if the length of the region is negligible or a multiple of a half plasma wavelength long, it follows from Equations 3 and 4 that $$\left.\begin{array}{l} v_{11}=v_{m1}=|v_{12}| \\ i_{11}=0=i_{12} \end{array}\right\} \qquad (12)$$

Then, across the very short gap between drift tube sections 5 and 6, a uniform potential gradient may be assumed, so giving, for small signals, $$v_{21}=\frac{u_1}{u_2}v_{12}=\left(\frac{V_{01}}{V_{02}}\right)^{1/2}v_{m1} \qquad (13)$$

so that in region 2

$$v_{m2}=\left(\frac{V_{01}}{V_{02}}\right)^{1/2}v_{m1}$$

and, at the end of the region, assumed an odd number of quarter wavelengths long, $$\left.\begin{aligned}|i_{22}|&=v_{m2}\frac{\omega}{\omega_2}\frac{I_0}{u_2}\\ v_{22}&=0\end{aligned}\right\} \qquad (14)$$

The total beam current is continuous in crossing from region 2 to region 3 so that $$i_{31}=i_{22}$$

i.e.

$$v_{m3}\frac{\omega}{\omega_3}\frac{I_0}{u_3}=v_{m2}\frac{\omega}{\omega_2}\frac{I_0}{u_2}$$

Thus $$\begin{aligned}v_{m3}&=\frac{\omega_3}{\omega_2}\frac{u_3}{u_2}v_{m2}\\ &=\frac{M_3}{M_2}\frac{\omega_{p3}}{\omega_{p2}}\frac{u_3}{u_2}v_{m2}\end{aligned} \qquad (15)$$

From (6)

$$\frac{\omega_{p3}}{\omega_{p2}}=\left(\frac{u_2}{u_3}\right)^{1/2}$$

so that $$v_{m3}=\frac{M_3}{M_2}\left(\frac{V_{01}}{V_{02}}\right)^{1/2}\left(\frac{V_{03}}{V_{02}}\right)^{1/4}v_{m1} \qquad (16)$$

If regions 1 and 3 are of the same geometry and voltage $$v_{m3}=\frac{M_1}{M_2}\left(\frac{V_{01}}{V_{02}}\right)^{3/4}v_{m1} \qquad (17)$$

Hence, if the entry to region 3 were immediately followed by the catcher gap, the overall gain of the amplifier would be increased by $$10\log_{10}\left(\frac{M_1}{M_2}\right)^2\left(\frac{V_{01}}{V_{02}}\right)^{3/2}$$

If, instead, region 3 were a quarter plasma wavelength long, followed by a low voltage, quarter wave length long region 4, a buncher gap at just beyond or a half wave length beyond the entry to high voltage region 5 would give two stages of velocity jump gain or a gain of $$20\log_{10}\left(\frac{M_1}{M_2}\right)^2\left(\frac{V_{01}}{V_{02}}\right)^{3/4}$$

Inspection of the curves of Fig. 2 indicates that a further increase of gain—called "space jump" gain—could be obtained by making the high voltage drift tube section of greater radius than the low voltage sections. In the interests of good $\beta$ factors however, the apertures through the resonators should be kept as small as possible. For the same reason the buncher gap is not placed at the end of a low voltage section but reverts to a high voltage. With two or more stages of velocity jump amplification, the middle high voltage drift tube sections can well be made of greater radius, as is indicated in Fig. 1, thus obtaining an additional space jump gain of $$20\log_{10}\frac{M_3}{M_1}=20\log_{10}\frac{\lambda_3}{\lambda_1}$$

From Fig. 3 it will be seen that a 6 db gain from this source is not unreasonable.

*Definition of noise figure*

A noise figure F for an amplifier is defined herein as 1+ the power ratio of the noise generated within the amplifier itself and measured in a load matched to the amplifier output impedance, to the amplified Johnson noise which would be measured in the same load were the amplifier noiseless and its input coupled to an impedance matching the input impedance of the amplifier. Thus, for an amplifier matched to an output load and to an input source, the noise power generated in the output load is simply F times the amplified inherent Johnson noise of the source—i.e. the noise sources within the amplifier are all considered as transferred to the matched input source. It follows that if $F_2$ is the noise figure of the second stage of a two-stage amplifier, $F_1$ that of the first stage and $G_1$ the power gain of the first stage, the overall noise figure for the amplifier is given by $$F=F_1+F_2/G_1 \qquad (18)$$

In particular, if $F_1$ is greater than about 4 and $G_1>2F_2$, the noise contribution of the second stage may be neglected. From this it follows that for an amplifier having two identical stages, for the first stage to be useful its gain should be greater than 8. For an input amplifier feeding a good crystal mixer stage, the minimum worthwhile gain may be considered to be 10 db.

Following common engineering practice the noise figure will, when convenient, be considered in decibels; thus by F db is meant 10 $\log_{10}F$ when F is defined as above.

*Klystron noise figure*

In a klystron amplifier the signal source is coupled to the buncher resonator through which the electron beam is projected. The electron beam is perturbed by noise from the electron gun and, prior to crossing the buncher gap, has mean square noise components of beam current and electron velocity:

$$\langle i^2\rangle \text{ and } \langle v^2\rangle$$

respectively. Consider, first, the current component $\langle i^2\rangle$. This generates across the buncher gap a mean square voltage $\langle i^2\rangle\beta^2R^2$ whereas the Johnson noise of the signal source generates a mean square voltage $\langle V_n^2\rangle$ say. Thus the contribution to the noise figure by the electron beam current is $\langle i^2\rangle\beta^2R^2/\langle V_n^2\rangle$. To obtain the effect of the velocity component $\langle v^2\rangle$, the Johnson noise of the source is converted into an equivalent velocity modulation $v_e$ at the buncher gap, thus obtaining for the noise figure of a glystron $$F=1+\langle i^2\rangle\beta^2R^2/\langle V_n^2\rangle+\langle v^2\rangle/\langle v_e^2\rangle \qquad (19)$$

From Equation 1

$$\langle v_e^2\rangle=\eta^2\beta^2\langle V_n^2\rangle/u^2 \qquad (20)$$

$$\langle V_n^2\rangle=4kT_aR\Delta f \qquad (21)$$

where $k$ is Boltzmann's constant$=1.380\times10^{-23}$ Joule/° K., $T_a$ is the resonator and source temperature in degrees Kelvin and $\Delta f$ is the bandwidth under consideration.

The following evaluation of noise in a klystron is believed to represent a novel approach to the problem and the present invention largely arises therefrom.

It is assumed herein that a sufficient approximation is obtained by considering the electron gun to be equivalent to an infinite planar diode and the noise waves in a drift tube situated between the anode of the gun and the butcher gap are then considered. Thus, in Fig. 4, the anode 12 of the electron gun is formed integrally with a pre-buncher drift tube section 13 while the buncher gap is formed between the ends of the pre-buncher drift tube 13 and the drift tube section 5, which latter corresponds to the similarly referenced main drift tube section in Fig. 1.

*Noise in a planar diode*

It is first assumed that the noise in the electron beam originates from a velocity modulation impressed on the beam at the virtual cathode in front of the cathode 14 of the gun. Following the work of Llewllyn, Peterson and Rack, it is shown in Beck, "Thermionic Valves," Cambridge University Press, 1953, at page 551, that the mean square noise modulation $\langle v_a^2 \rangle$ at the virtual cathode of an infinite planar diode is given by $$\langle v_a^2 \rangle = \frac{4kT\eta}{I_0}\left(1-\frac{\pi}{4}\right)\Delta f \qquad (22)$$

where T is the absolute temperature of the cathode. At the anode it is shown that the velocity modulation noise component $v_b$ and the conduction current $i_b$ are given, respectively, by $$\langle v_b^2 \rangle = \langle v_a^2 \rangle \qquad (23)$$

and $$\langle i_b^2 \rangle = \frac{I_0\theta_1^2}{u_b}\langle v_a^2 \rangle \qquad (24)$$

where $\theta_1$ is the electron transit angle between the virtual cathode and the anode and where $u_b$ is the mean electron velocity at the anode. From the theory leading to Child's law it can be shown that $$\theta_1^2 = \frac{2\epsilon_0 u_1}{\eta}\frac{\omega^2}{J_0} = 2\left(\frac{\omega}{\omega_p}\right)^2 \qquad (25)$$

where, comparing with Equation 6, $\omega_p$ is the plasma frequency in a drift tube at the diode anode potential. It must be emphasised that in the cathode-anode region the concept of plasma frequency cannot arise; the second equality in 25 merely indicates that in an arrangement such as that of Fig. 4, the stated equality exists between the values of the diode transit angle and the plasma frequency within drift tube 13.

*Noise in pre-buncher drift tube*

Figure 4:
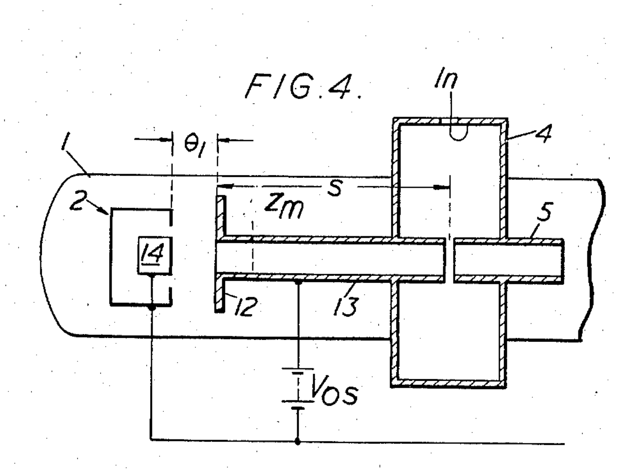
Fig. 4 is a diagrammatic view of the input part of an electron discharge tube employing a pre-buncher drift tube in accordance with the invention.

In Fig. 4 there is indicated a single region $s$ extending from the diode anode 12 to the buncher gap. Drift tube 13 and the resonator 4 are maintained at a voltage $V_{0s}$. (Throughout the analysis the letter $s$ will be used to distinguish the pre-buncher region immediately adjacent the buncher resonator.)

First the plasma wave equations for the region $s$ corresponding to the Equations 3 and 4 are established. At the entry to the drift tube, where $z=0$, comparing Equations 3 and 23, 4 and 24

$$\langle v_m^2 \rangle \cos^2\psi = \langle v_a^2 \rangle$$

and $$\langle v_m^2 \rangle \left(\frac{\omega}{\omega_s}\right)^2\left(\frac{I_0}{u_s}\right)^2 \sin^2\psi = \left(\frac{I_0\theta_1}{u_s}\right)^2\langle v_a^2 \rangle \qquad (26)$$

where the peak velocity modulation $\langle v_m^2 \rangle$ represents the mean square of the peak amplitude of the standing waves of velocity in the space charge within the drift tube. The mean electron velocity $u_b$ at the diode anode in Equation 24 becomes $u_s$ in the present case.

Thus $$\langle v_m^2 \rangle \sin^2\psi = \left(\frac{\omega_s}{\omega}\theta_1\right)^2\langle v_a^2 \rangle$$

Eliminating $\psi$ $$\langle v_m^2 \rangle = \left[1+\left(\frac{\omega_s}{\omega}\right)^2\theta_1^2\right]\langle v_a^2 \rangle$$

$$= (1+2M_s^2)\langle v_a^2 \rangle \qquad (27)$$

from (25) and there is obtained:

$$\cos^2\psi = (1+2M_s^2)^{-1} = \cos^2\frac{\omega_s}{u_s}z_m \qquad (28)$$

where $z_m$ is the co-ordinate of the plane of maximum mean square noise velocity. Equation 28 indicates that the velocity modulation is not a maximum at the drift tube entry, as in the case with signal velocity modulation in a drift tube immediately following a buncher gap. On the contrary, the noise velocity modulation reaches a maximum some little way along the pre-buncher drift tube, as indicated by the plane $z_m$ in Fig. 4.

From Equations 3 and 4, with substitutions from Equations 27, 28 and 22, the following explicit equations for the noise space-charge waves in the single sectioned pre-buncher drift tube are obtained:

$$\langle v^2 \rangle = (1+2M_s^2)\frac{4kT\eta}{I_0}\left(1-\frac{\pi}{4}\right)\Delta f\cos^2\frac{\omega_s}{u_s}(z-z_m) \qquad (29)$$

$$\langle i^2 \rangle = (1+2M_s^2)\frac{4kT\eta}{I_0}\left(1-\frac{\pi}{4}\right)\Delta f\left(\frac{\omega}{\omega_s}\right)^2\left(\frac{I_0}{u_s}\right)^2 \sin^2\frac{\omega_s}{u_s}(z-z_m) \qquad (30)$$

At the buncher gap put $z=z_s$ and write $$\frac{\omega_s}{u_s}(z_s-z_m)=\phi \qquad (31)$$

Substituting in Equation 19 the above values of $\langle v^2 \rangle$ and $\langle i^2 \rangle$ evaluated at the buncher gap and also putting in the values of $\langle v_e^2 \rangle$ and $\langle V_n^2 \rangle$ from Equation 20 and 21, the following equation for the noise figure is obtained (it is believed for the first time):

$$F = 1+\left(1-\frac{\pi}{4}\right)\frac{T}{T_a}(1+2M_s^2)\left[\left(\frac{\omega}{\omega_s}\right)^2\frac{1}{P}\sin^2\phi + P\cos^2\phi\right] \qquad (32)$$

where P is given by Equation 10 evaluated at the resonator voltage $V_{0s}$.

The factor in the square brackets of Equation 32 can be written $$\left(\frac{\omega}{\omega_s}\right)^2\frac{1}{P}\left[1+\left\{P^2\left(\frac{\omega_s}{\omega}\right)^2-1\right\}\cos^2\phi\right] = \left(\frac{\omega}{\omega_s}\right)^2\frac{1}{P}\left[1+(L^2-1)\cos^2\phi\right] \qquad (33)$$

where L is the basic klystron loss as given by Equation 11. It can be seen at once that if the amplifier has a basic klystron loss, i.e. $L^2>1$, (33) is a minimum when $\cos^2\phi=0$. Otherwise, if there is to be a basic klystron gain $(L^2<1)$ the noise figure is a minimum when $\sin^2\phi=0$. It has previously been suggested that, in a klystron, a pre-buncher drift tube should be used to obtain a low noise figure, the drift tube length being such as to correspond with the case in which $\sin^2\phi=0$. This would be correct for a tube having a basic klystron gain, but such a tube would be of the high power class, unsuitable for use as an input amplifier.

By way of example, consider an input amplifier for a mid-band frequency of 4000 megacycles/sec. and having a response which falls 3 db at 60 mc./s. off tune. For a klystron having identical buncher and catcher resonators, each equivalent, when matched to their feeders, to a parallel tuned circuit having capacitance C and shunt resistance R, $$20\log_{10}[1+(\Delta Q)^2]=3 \qquad (34)$$

where $\Delta=60/4000$ and $Q=\omega RC$.

Then $Q=43$. The capacitance can be expected to be about $0.3\times10^{-12}$ farad so that $R=5.7\times10^3$ ohms.

If $$M=\lambda b\omega/u$$

be put in Equation 11 and the constants be evaluated, there is obtained $$L^2=1.21\times10^5\frac{\lambda^2V_0^{1/2}}{I_0(\beta^2R)^2} \qquad (35)$$

Reference to Fig. 3 shows that $\lambda \doteq 0.4$ for $B<1$ and beam and drift tube of the same radius.

Taking $\beta^2=0.7$ and $R=5.7\times10^3$, $$L^2=1.21\times10^{-3}V_0^{1/2}/I_0$$

For a tube giving 10 db gain with a voltage of 250, a current of about 190 milliamperes would be needed. It is concluded, therefore, that if the pre-buncher drift tube is of such length that $\sin^2\phi=0$, a tube having a basic klystron gain is required and, in general, this means using a low voltage and a high beam current.

On the other hand, if a basic klystron loss could be tolerated, i.e. $L^2>1$, the requirement is that $\cos^2\phi=0$.

Putting $\cos^2\phi=0$ in Equation 32 gives a noise figure $$F=1+\left(1-\frac{\pi}{4}\right)\frac{T}{T_a}(1+2M_s^2)\left(\frac{\omega}{\omega_s}\right)^2\frac{1}{P} \qquad (36)$$

Now $1+2M_s^2$ varies at most between 1 and 3, while $$\left(\frac{\omega_s}{\omega}\right)^2P=M_s^2\left(\frac{\omega_p}{\omega}\right)^2P=6.05\times10^4\frac{\lambda^2}{V_0^{1/2}\beta^2R}$$

It will be seen that in this case the noise figure is independent of the beam current; in the other case ($\sin^2\phi=0$) it is directly dependent on it.

Clearly, however, a klystron having a loss is not an amplifier and some other means than the basic klystron gain (or loss) must be introduced to obtain amplification.

As has been shown above, the overall gain of a klystron using velocity jump amplification together, possibly, with space jump amplification, is basic klystron gain (or loss) plus velocity jump gain, plus space jump gain, and the noise calculations, being concerned only with the pre-buncher and buncher regions, are not affected by these additional gains in the drift space following the buncher gap.

Hence, according to the invention a klystron having a pre-buncher drift tube with $\cos^2\phi=0$ is used with a klystron section having a basic loss but having overall amplification by virtue of velocity jump and possibly space jump amplification.

Reference to Equation 31 will show that this means that the buncher gap must be situated at an odd number of quarter wavelengths of the electron space charge waves beyond the plane of maximum means square noise velocity, so that at the buncher gap the mean square noise velocity is a minimum and the mean square noise current a maximum.

It will now be shown that, with the same initial assumption regarding the noise source, a velocity jump in the pre-buncher drift tube may be used further to reduce the noise figure.

*Velocity jump in pre-buncher drift tube*

Figure 5:
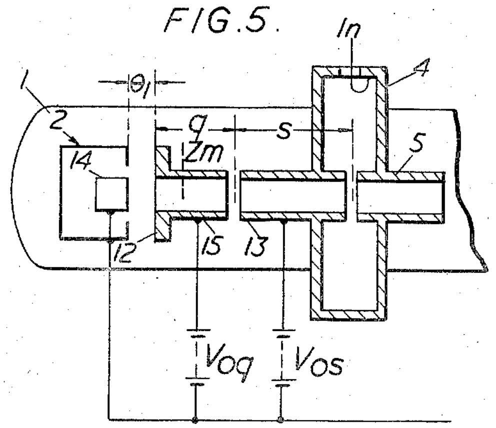
Fig. 5 shows a modification of the arrangement of Fig. 4 to include velocity jump in the pre-buncher drift tube.

Referring now to Fig. 5, the case when the pre-buncher drift tube is divided into two sections, as indicated, will now be considered. An additional length 15 of drift tube is formed integrally with anode 12 and is maintained at a voltage $V_{0q}$ with respect to the cathode. The voltage $V_{0s}$ of region $s$ adjacent the buncher gap is greater than that of region $q$.

The equations for the space charge waves in region $q$ are the same as Equations 29 and 30, with the substitution of $q$ for $s$ throughout. The gap between drift tube sections 13 and 15 is located at a plane of maximum noise velocity so as to obtain the greatest effect from the jump. Thus the length $z_q$ of section 15 is made either equal to $z_m$ or an integral number of half plasma wavelengths more. Then, immediately to the left and right of the jump, $$\langle i_q^2\rangle=0=\langle i_s^2\rangle$$

and, following Equation 13, $$\langle v_{s1}^2\rangle=\frac{V_{0q}}{V_{0s}}\langle v_{q2}^2\rangle \qquad (37)$$

i.e.

$$\langle v_{ms}^2\rangle=(1+2M_q^2)\frac{4kT\eta}{I_0}\left(1-\frac{\pi}{4}\right)\Delta f\frac{V_{0q}}{V_{0s}} \qquad (38)$$

In accordance with the principles of the invention, drift tube section 13 is made an odd number of quarter plasma wavelengths long so that the noise velocity modulation is zero at the buncher gap and the noise current is a maximum. Thus, from (19), the noise figure becomes simply $$F=1+\langle i_{s2}^2\rangle\beta^2R^2/\langle V_n^2\rangle$$

which reduces to $$F=1+\left(1-\frac{\pi}{4}\right)\frac{T}{T_a}(1+2M_q^2)\left(\frac{\omega}{\omega_s}\right)^2\frac{1}{P}\frac{V_{0q}}{V_{0s}} \qquad (39)$$

If there be written $$N=F-1 \qquad (40)$$

and suffixes 1 and 2 are used to denote, respectively, the case without and with velocity jump, comparing Equations 36 and 39, for the same resonators and resonator voltage the following is obtained:

$$\frac{N_2}{N_1}=\frac{1+2M_q^2}{1+2M_s^2}\frac{V_{0q}}{V_{0s}} \qquad (41)$$

Reference to Fig. 2 shows that though $M_q>M_s$, the fraction involving the M's is not of great significance. It will be seen that the noise may be considerably reduced by the velocity jump if the initial assumptions regarding the origin of the noise are correct.

So far, however, only the noise components arising from a noise velocity modulation impressed on the beam at the virtual cathode have been considered. As stated near the commencement of the specification, there is reason to believe that additional noise components are also present in the beam. These will be referred to as uncorrelated noise components.

*Uncorrelated noise components*

It has been assumed, prior to the present invention, that in addition to the noise velocity modulation impressed on the beam at the virtual cathode, current fluctuations are also injected thereat. It will now be shown that the possible existence of such noise fluctuations does not appreciably affect the operation of the invention even though it offsets the noise reduction which could otherwise be obtained by negative velocity jump amplification, as above, in the pre-buncher drift tube.

The effect of these fluctuations at the anode of the infinite plane diode assumed to be equivalent to the electron gun has been stated to be $$\left.\begin{aligned}\langle v_b'^2\rangle&=0\\ \langle i_b'^2\rangle&=\frac{\pi kTI_0}{2V_0}\Delta f\end{aligned}\right\} \qquad (42)$$

where $v_b'$ and $i_b'$ are, respectively, the resulting additional velocity and noise current at the anode. To distinguish from the noise components previously dealt with, symbols relating specifically to the uncorrelated noise components will be primed; in other respects the same notation will be used. Following the same steps as previously used to set up the noise space charge wave equations [Equations 26 to 30], there is obtained for the additional space charge waves in region $q$:

$$\langle v_{mq}'^2\rangle=\frac{\pi kT\eta}{I_0}\left(\frac{\omega_q}{\omega}\right)^2\Delta f$$

and $$\psi_q'=(2n+1)\frac{\pi}{2} \qquad (43)$$

where $n=0, 1, 2 \ldots$ etc.

At the end of the region $q$, at $z_m$ or an integral number of half plasma wavelengths therefrom, there is now, substituting for the sine and cosine terms from Equation 28 in which, however, $q$ is now substituted for $s$, $$\left.\begin{aligned}\langle v_{q2}'^2\rangle &= \langle v_{m2}'^2\rangle \cos^2\left(\frac{\omega_q}{u_q}z_m-\psi_q'\right)\\ &= \frac{\pi kT\eta}{I_0}\left(\frac{\omega_q}{\omega}\right)^2\Delta f\frac{2M_q^2}{1+2M_q^2}\\ \langle i_{q2}'^2\rangle &= \langle v_{mq}'^2\rangle\left(\frac{\omega}{\omega_q}\right)^2\left(\frac{I_0}{u_q}\right)^2\sin^2\left(\frac{\omega_q}{u_q}z_m-\psi_q'\right)\\ &= \frac{\pi kTI_0}{2V_{0q}}\Delta f\frac{1}{1+2M_q^2}\end{aligned}\right\} \quad (44)$$

In going to region $s$ it must be remembered that neither of the additional space charge waves is at a node at the end of region $q$ and that, therefore, a phase constant $\psi_s'$ must be retained in the space charge wave equations. At the entry to region $s$, therefore, $$\left.\begin{aligned}\langle v_{s1}'^2\rangle &= \langle v_{ms}'^2\rangle\cos^2\psi_s' = \frac{V_{0q}}{V_{0s}}\langle v_{q2}'^2\rangle\\ \langle i_{s1}'^2\rangle &= \langle v_{ms}'^2\rangle\left(\frac{\omega}{\omega_s}\right)^2\left(\frac{I_0}{u_s}\right)^2\sin^2\psi_s' = \langle i_{q2}'^2\rangle\end{aligned}\right\} \quad (45)$$

i.e.

$$\langle v_{ms}'^2\rangle\sin^2\psi_s' = \frac{\pi kT\eta}{I_0}\Delta f\left(\frac{u_s}{u_q}\right)^2\left(\frac{\omega_s}{\omega}\right)^2(1+2M_q^2)^{-1}$$

and $$\langle v_{ms}'^2\rangle\cos^2\psi_s' = \frac{\pi kT\eta}{I_0}\Delta f\left(\frac{u_q}{u_s}\right)^2\left(\frac{\omega_q}{\omega}\right)^2\frac{2M_q^2}{1+2M_q^2} \quad (46)$$

In accordance with the invention, the length $z_s$ of the drift tube section 13 is such that $$\left.\begin{aligned}&\cos^2\frac{\omega_s}{u_s}z_s = 0\\ &\text{so that}\\ &\langle v_{s2}'^2\rangle = \langle v_{ms}'^2\rangle\cos^2\left(\frac{\omega_s}{u_s}z_s-\psi_s'\right) = \langle v_{ms}'^2\rangle\sin^2\psi_s'\\ &\text{and}\\ &\langle i_{s2}'^2\rangle = \langle v_{ms}'^2\rangle\left(\frac{\omega}{\omega_s}\right)^2\left(\frac{I_0}{u_s}\right)^2\cos^2\psi_s'\end{aligned}\right\} \quad (47)$$

To obtain the noise figure the factors $$\langle v_{s2}'^2\rangle/\langle v_e^2\rangle \text{ and } \langle i_{s2}'^2\rangle\beta^2R^2/\langle V_n^2\rangle$$

must be added to the noise figure of Equation 39. From Equations 46 and 47 together with 20 and 21 we find $$\langle v_{s2}'^2\rangle/\langle v_e^2\rangle = \frac{\pi}{4}\frac{T}{T_a}\frac{1}{1+2M_q^2}P\left(\frac{\omega_s}{\omega}\right)^2\frac{V_{0s}}{V_{0q}} \quad (48)$$

and $$\langle i_{s2}'^2\rangle\beta^2R^2/\langle V_n^2\rangle = \frac{\pi}{4}\frac{T}{T_a}\frac{2M_q^2}{1+2M_q^2}\frac{1}{P}\left(\frac{\omega_q}{\omega_s}\right)^2\frac{V_{0q}}{V_{0s}} \quad (49)$$

By putting $V_{0q}=V_{0s}$ in Equations 48 and 49, the effect of the uncorrelated noise components is obtained in the absence of velocity jump in the pre-buncher drift tube. It becomes apparent that a velocity jump which reduces the effect of the originally considered noise components increases the effect of the uncorrelated noise components.

Adding (48) and (49) to Equation 39 the complete noise figure becomes:

$$F' = 1+\left(1-\frac{\pi}{4}\right)\frac{T}{T_a}(1+2M_q^2)\left(\frac{\omega}{\omega_s}\right)^2\frac{1}{P}\frac{V_{0q}}{V_{0s}}\left[1+\frac{\pi/4}{1-\pi/4}\cdot\left(\frac{\omega_q}{\omega}\right)^2\frac{2M_q^2}{1+2M_q^2}\right]+\frac{\pi}{4}\frac{T}{T_a}\frac{1}{1+2M_q^2}\left(\frac{\omega_s}{\omega}\right)^2P\frac{V_{0s}}{V_{0q}} \quad (50)$$

which again we believe to be an equation not previously obtained.

Putting $$Y = \frac{1}{1+2M_q^2}P\left(\frac{\omega_s}{\omega}\right)^2\frac{V_{0s}}{V_{0q}} \quad (51)$$

the new noise figure can be written $$F' = 1+\frac{T}{T_a}\left[\left(1-\frac{\pi}{4}\right)(1+A)\frac{1}{Y}+\frac{\pi}{4}Y\right] \quad (52)$$

where $$A = 2\frac{\pi/4}{1-\pi/4}\left(\frac{\omega_{pq}}{\omega}\right)^2\left(\frac{M_q^2}{1+2M_q^2}\right)^2$$

($\omega_{pq}$ is $\omega_p$ evaluated at $V_{0q}$).

Then $$F' = 1+\frac{T}{T_a}\left[\left\{\left(1-\frac{\pi}{4}\right)^{1/2}(1+A)^{1/2}Y^{-1/2}-\left(\frac{\pi}{4}\right)^{1/2}Y^{1/2}\right\}^2+2\left(\frac{\pi}{4}\right)^{1/2}\left(1-\frac{\pi}{4}\right)^{1/2}(1+A)^{1/2}\right] \quad (53)$$

Now since both $$\left(\frac{\omega_{pq}}{\omega}\right)^2$$

and $M_q^2$ are generally small compared to unity, A is a small quantity which may certainly be neglected in Y, the minimum of F′ being very broad.

Hence for $$Y_{\text{opt.}} = \sqrt{(4-\pi)/\pi} \quad (54)$$

$$F'_{\text{min.}} \doteq 1+2\frac{T}{T_a}\sqrt{\frac{\pi}{4}\left(1-\frac{\pi}{4}\right)} \quad (55)$$

Putting $T=1000°$ K. and $T_a=290°$ K., $$F'_{\text{min.}} = 3.76$$

Thus a minimum noise figure of 2.8 db is obtained, in general agreement with the 6 db figure quoted earlier. It will be noted that though the velocity jump does not reduce the minimum noise figure it enters into the expression for Y which has to be optimised. This point will be further examined later.

It is of interest to see what would have been the result had an attempt been made to optimise the length of drift tube section 15, taking into account the uncorrelated noise components. The analysis is somewhat laborious, but is similar to that given above. In the result, it is found that the minimum noise figure is independent of any velocity jump in the pre-buncher drift tube, but is dependent on the length.

If, following Equation 31, there be written $$\frac{\omega_q}{u_q}(z_q-z_m) = \phi' \quad (56)$$

where $z_q$ is the length of drift tube section 15. (Referring back to the discussion following Equation 43 it will be seen that in this invention $\sin^2\phi'=0$.) It is found that the optimum value of $\phi'$ is given by $$\tan 2\phi'_{\text{opt.}} = \frac{\pi/4}{1-\pi/4}\left(\frac{\omega_q}{\omega}\right)^2\frac{2\sqrt{2}M_q}{(1+2M_q^2)^2}\Bigg/\left[1-\frac{\pi/4}{1-\pi/4}\left(\frac{\omega_q}{\omega}\right)^2\frac{1-2M_q^2}{(1+2M_q^2)^2}\right] \quad (57)$$

and that the minimum value of F′ becomes $$F'_{\text{min.}} = 1+2\sqrt{\frac{\pi}{4}\left(1-\frac{\pi}{4}\right)}\frac{T}{T_a}$$

exactly, instead of approximately as in Equation 55.

Since, in practice, the right hand side of (57) is a small quantity, it follows, approximately, that $$\phi'_{\text{opt.}} = \frac{\sqrt{2}\pi}{4-\pi}\left(\frac{\omega_q}{\omega}\right)^2\frac{M_q}{(1+2M^2)^2}+n\frac{\pi}{2} \quad (58)$$

where $n=0, 1, 2, 3$ . . . etc.

or, since $$\left(\frac{\omega_q}{\omega}\right)^2 M_q \ll 1$$

a negligible error will ensue if it be concluded $$\phi'_{\text{opt.}} = \frac{n\pi}{2} \tag{58a}$$

It is seen, therefore, that when the uncorrelated noise components are taken into account an optimum value of drift tube length is obtained, for all practical purposes, whether the buncher gap is placed where the mean square noise velocity is a minimum and the mean square noise current a maximum, or vice versa. In this invention, $\sin^2 \phi'=0$, so that, remembering that the drift tube section 13 is an odd multiple of a quarter plasma wavelength long, minimum noise velocity is still obtained at the buncher gap whether or not the uncorrelated noise components are considered. Although with $\cos^2 \phi'=0$ the minimum noise figure would also be obtained, the parameters to be optimised are very different.

In the general case the analysis shows that the quantity $$P\left(\frac{\omega_s}{\omega_q}\right)^2 \frac{V_{0s}}{V_{0q}} = Y' \text{ say} \tag{59}$$

must be optimised in terms of $\phi'$. In the case of the present invention, with $\sin^2 \phi'=0$, $$Y'_{\text{opt.}} = \left(\frac{4-\pi}{\pi}\right)^{1/2} (1+2M_q^2)\left(\frac{\omega}{\omega_q}\right)^2 (1+A)^{1/2} \tag{60}$$

where A represents the same terms as in Equation 52. Comparison with Equations 51 and 53 shows, as of course it should, that exactly the same results follow as in the previous analysis. On the other hand, with $\cos^2 \phi'=0$ there would be obtained $$Y'_{\text{opt.}} = \left(\frac{\pi}{4-\pi}\right)^{1/2} (1+2M_q^2)^{-1}(1+A)^{-1/2} \tag{61}$$

Comparing (59) and (61) with (51), (53) and (54), but writing $Y_1$ in place of the previous $Y_{\text{opt.}}$, and again ignoring the term $1+A$, it is found that $$Y_1 = \frac{1}{1+2M_q^2} \frac{1}{P}\left(\frac{\omega_q}{\omega_s}\right)^2 \frac{V_{0q}}{V_{0s}}\Bigg) - \frac{\pi}{4-\pi}\Bigg)^{1/2} \tag{62}$$

Since $Y_{\text{opt.}}$ depends, essentially, on $$P\left(\frac{\omega_s}{\omega}\right)^2$$

which does not involve the beam current, whereas $Y_1$ is a function primarily of $1/P$, it will be seen that in this invention the minimum noise figure is independent of the beam current, and hence of the amplifier gain, while in the other arrangement the noise figure is a function of the beam current and the noise figure and gain are intimately connected. To satisfy Equation 62 with $V_{0q}=V_{0s}$ it will be found that a high current, low voltage tube is required, in fact, referring back to the high power tube discussed earlier, when the uncorrelated noise components were ignored, it will be found that, taking a mean value of 1.6 for $1+2M_q^2$, the design constants of that tube satisfy Equation 62 as it stands with a value of $V_{0q}/V_{0s}$ of about one quarter. In this invention, on the other hand, so far as noise is concerned, the smallest beam current which will give the low power output required of an input amplifier can be used.

*Power output requirements*

Although the power gain requirements of an input amplifier have been discussed, the output power required has not yet been considered. It may be said, arbitrarily, that the power output of the input amplifier must be some 13–20 db above the noise power generated in the second stage. By considering a second stage having a noise figure of 10 db and a bandwidth of 20 mc./s. and adding a margin of some 40 db to allow for fading and other variations in the input signal, it is found that for a 5700 ohm loaded resonator impedance a beam current of less than 30 microamperes provides sufficient power. This, then, is a measure of the lower limit of beam current $I_0$ for an input amplifier to operate at 4000 mc./s. with a response falling 3 db at 60 mc./s. off tune. For reasons of mechanical design a much larger beam current is used in the embodiment now to be described.

*Practical design*

Figure 6:
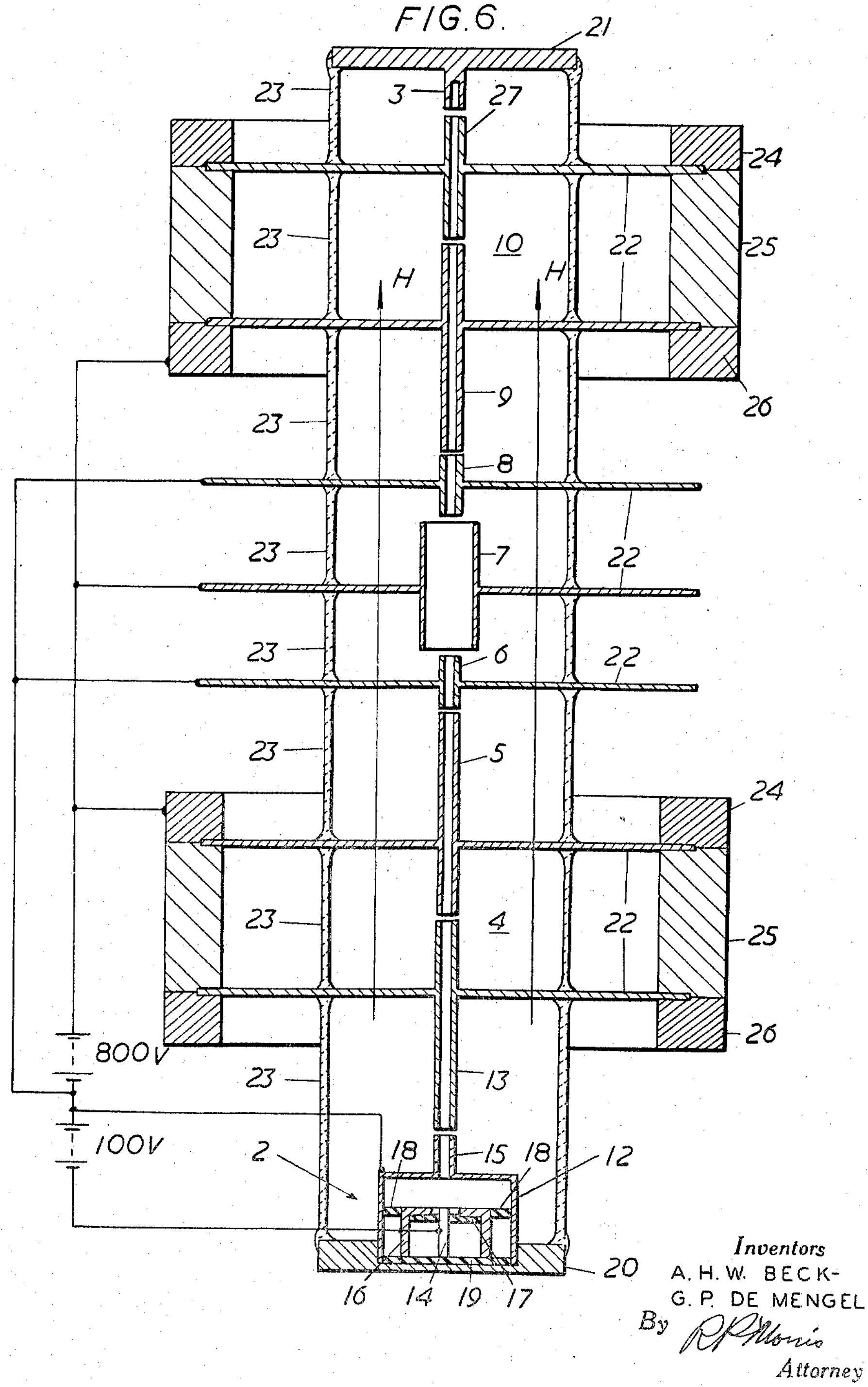
Fig. 6 shows an embodiment of an amplifier and amplifier tube construction according to the invention.

The construction of a practical amplifier in accordance with the invention is shown in Fig. 6 in which the same reference numerals have been used as in previous figures to identify parts having corresponding like functions.

The electron gun 2 has a sintered bariated nickel cathode 14, such as disclosed in co-pending application Serial No. 446,206, filed July 28, 1954, supported in a surrounding focusing electrode 16 by a washer 17. The focusing electrode and cathode assembly is, in turn, mounted within a surrounding anode 12 of nonmagnetic material by means of insulators 18 and 19. The gun assembly is shown mounted on a plate 20, which is of magnetic material, and which closes one end of the envelope. The anode 12 carries a forwardly projecting tube which, together with the anode beam aperture, forms the pre-buncher drift tube section 15. The collector electrode 3 is formed as a projection from a second envelope end plate 21 of magnetic material so that the two end plates 20 and 21 conveniently form pole pieces for a magnetic focusing arrangement, not shown, to produce the applied magnetic field H.

All the drift tube sections other than 15 are mounted on metal discs 22 which are sealed between glass collars 23 which, with the end plates 20 and 21 form the tube envelope. These discs serve to make the necessary connections to the drift tube sections. The two end pairs of discs 22 to serve as wall portions of the resonators 4 and 10, each pair being clamped between metal rings 24, 25 and 26 to form a cylindrical resonator. In addition to the drift tube sections 15, 13 and 5 to 9, a further drift tube section 27 is included to form with section 9 the catcher gap in resonator 10.

To maintain the $\beta$ factors of buncher and catcher gaps as high as possible, as has previously been discussed, the high voltage drift tube sections 5 and 9 are as close about the beam as possible without intercepting appreciable beam current. The middle high voltage drift tube section 7 is made five times the beam diameter.

With a beam diameter of 1 mm. and a D.C. beam current of 15 ma., for the 5700 ohm resonator previously considered with $\beta^2=0.7$ and the resonator maintained, as indicated, at 900 volts positive with respect to the cathode, the basic klystron loss is 3.8 db. The two stages of velocity jump amplification, using a step down in drift tube voltage to 100 volts, as shown in Fig. 6, provides a gain of 14.3 db, while the additional space jump gain provided by the increase in diameter of drift tube section 7 adds a further 4.1 db, so that the overall gain is 14.6 db.

To attain the minimum noise figure, the low voltage pre-buncher section should be maintained at 75 volts. Since, however, the more convenient anode voltage of 100 results in a degradation of the noise figure by only 0.2 db, the same potential of 100 volts is used for both pre- and post-buncher low voltage sections.

The length of each of the various drift tube sections, excepting 15, is such as to accommodate an odd multiple of a quarter plasma wavelength therein; sections 6 and 8 are each three-quarters, the remainder one quarter wavelength long. The length of drift tube section 15 is determined from Equation 28 with $q$ substituted for $s$, from which it is found that $(1+2M_q^2)^{-1}=\cos^2 42.6°$ so that the plane of maximum noise velocity (in the absence of the uncorrelated noise components) is some tenth of a plasma wavelength along drift tube section 15 and the latter is made 0.6 of a plasma wavelength long.

The plasma wavelength in any region $r$ is $$\frac{2\pi u_r}{\omega_r}$$

from which it can be shown that the wavelength is proportional to $V_r^{5/4}$ and inversely proportional to $J_0^{1/2}$. For the embodiment illustrated in Fig. 6 the plasma wavelength in the low voltage drift tube sections is 7.2 mm. and in the high voltage sections, other than sections 7, is 8.53 cms. The plasma wavelength in drift tube section 7 is found to be 5.3 cms. Thus the total length of the amplifier tube from the electron gun anode to the catcher gap is approximately 9.3 cms., giving a conveniently small tube.

As an example of the flexibility in design afforded by the present invention, the case can be considered where the beam current is reduced by a factor of 50 from 15 ma. to 0.3 ma. For the same beam diameter drift tube diameter and voltages, the noise figure remains the same, but the basic klystron loss would be increased about seven times, from 4 to 21 db. An extra two stages of velocity jump amplification could be used to offset the added klystron loss, while the arrangement would allow both extra stages to include additional space jump amplification. The overall gain would then be about 15 db instead of the 14 db provided by the embodiment described with reference to Fig. 6. Due more to the increased plasma wavelength, however, than to the mere addition of the extra lengths of drift tube involved, the physical length of the tube from anode to catcher gap would become some 80 cms. Although, with such a length, that design is not likely to be a practical proposition, it serves to illustrate the flexibility in design of embodiments of the present invention. Mechanical consideration and questions of magnetic field requirements for focusing the electron beam would determine, in any particular case, how far one could conveniently go in reducing beam current density at the expense of physical length of structure. In all cases, ignoring any added noise due to beam current interception, the minimum noise figure can be attained, in contradistinction to the prior art in which the noise figure and beam current are directly related. It should be mentioned that where, in the above, the increased flexibility of design of embodiments of the present invention has been contrasted with the prior art, a degree of flexibility has been added to the latter by utilizing therein velocity jump in the pre-buncher drift tube, the benefit of which has previously been overlooked as it does not affect the minimum noise figure.

In the embodiments described, a two-section pre-buncher drift tube has been considered with the electron gun anode at the lower voltage. The invention is not limited to such an arrangement; provided it be arranged in all cases that there is minimum noise velocity at the buncher gap, the electron gun anode could be put at a higher voltage than the resonators, and an extra section or sections of pre-buncher drift tube be employed as required.

While the principles of the invention have been described above in connection with specific embodiments, and particular modifications thereof, it is to be clearly understood that this description is made only by way of example and not as a limitation on the scope of the invention.

What we claim is:

1. An electron velocity modulation amplifier having an electron gun having a cathode and an apertured anode, a resonator having a buncher gap, and means for providing velocity jump amplifier beyond said resonator, and means for projecting a beam of electrons from said gun through said resonator buncher gap and said velocity-jump amplifier means, said beam having a point where the mean square noise velocity of the beam electrons at the midband operating frequency of the amplifier is a maximum and another point at which the said noise velocity is at a minimum, in combination a device for reducing the velocity modulation noise effects comprising a drift tube means insulated from said anode and mounted between said anode and said buncher gap for traversal by said beam, said drift tube means extending toward said cathode and positioned to embrace said point of maximum noise and extending from said point substantially a quarter wavelength at the plasma frequency, or odd multiple thereof to said gap, to locate the said buncher gap at the region where the said mean square noise velocity is at a minimum.

2. An amplifier according to claim 1 in which the said drift tube is longitudinally subdivided into sections substantially at said first-mentioned point, further comprising means for applying different potentials to said sections, to accelerate said beam between said sections.

3. An electron velocity modulation device comprising an electron gun producing an electron beam having a plane of maximum mean square noise velocity, means providing buncher and catcher gaps situated in buncher and catcher resonators respectively, a plurality of insulated drift tubes sections mounted between said buncher and catcher resonators, means for applying potentials to said drift tube sections to provide velocity jump amplification, and an additional drift tube mounted between said electron gun and said buncher gap of such length that the buncher gap is situated at an odd number of quarter wave-lengths of the electron space charge wave therein beyond said plane of maximum mean square noise velocity, and the said buncher gap is located at the region of minimum mean square noise velocity.

4. An electron velocity modulation device as claimed in claim 3, in which said drift tube sections are of different diameters to provide space jump amplification.

5. An electron velocity modulation device as claimed in claim 3, in which said additional drift tube is divided into two sections, further comprising means for applying to the section adjacent the buncher gap a higher potential than the potential applied to the other section, said gap being positioned substantially at said plane of maximum mean square noise velocity.

References Cited in the file of this patent

UNITED STATES PATENTS

| | | |
|---|---|---|
| Re. 22,580 | Mouromtseff et al. | Dec. 19, 1944 |
| 2,422,695 | McRae | June 24, 1947 |
| 2,423,968 | Falk | July 15, 1947 |
| 2,463,267 | Hahn | Mar. 1, 1949 |
| 2,547,061 | Touraton et al. | Apr. 3, 1951 |
| 2,767,259 | Peter | Oct. 16, 1956 |
| 2,824,289 | Murdock | Feb. 18, 1958 |
| 2,824,997 | Haeff | Feb. 25, 1958 |

FOREIGN PATENTS

| | | |
|---|---|---|
| 716,707 | Great Britain | Oct. 13, 1954 |